Nov. 21, 1944.  W. H. KOHLHAFER ET AL  2,363,007
EQUIPMENT FOR CUTTING CIRCLES IN METAL SHEETS OR PLATES
Filed Oct. 19, 1943
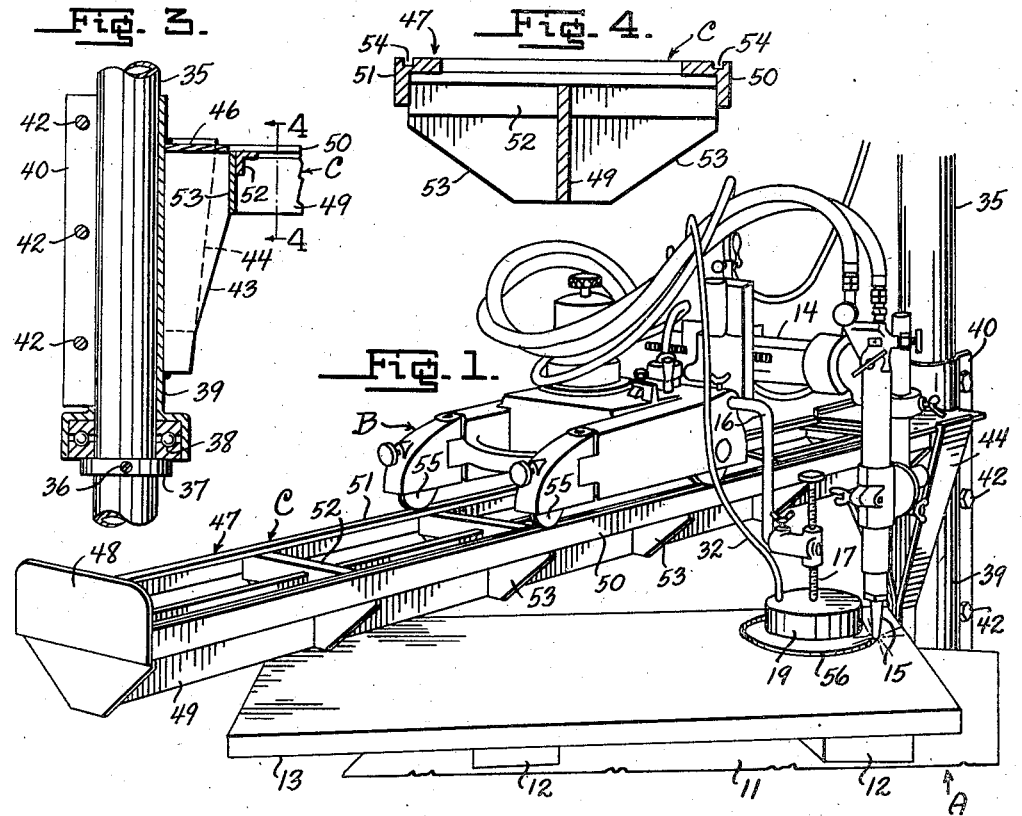
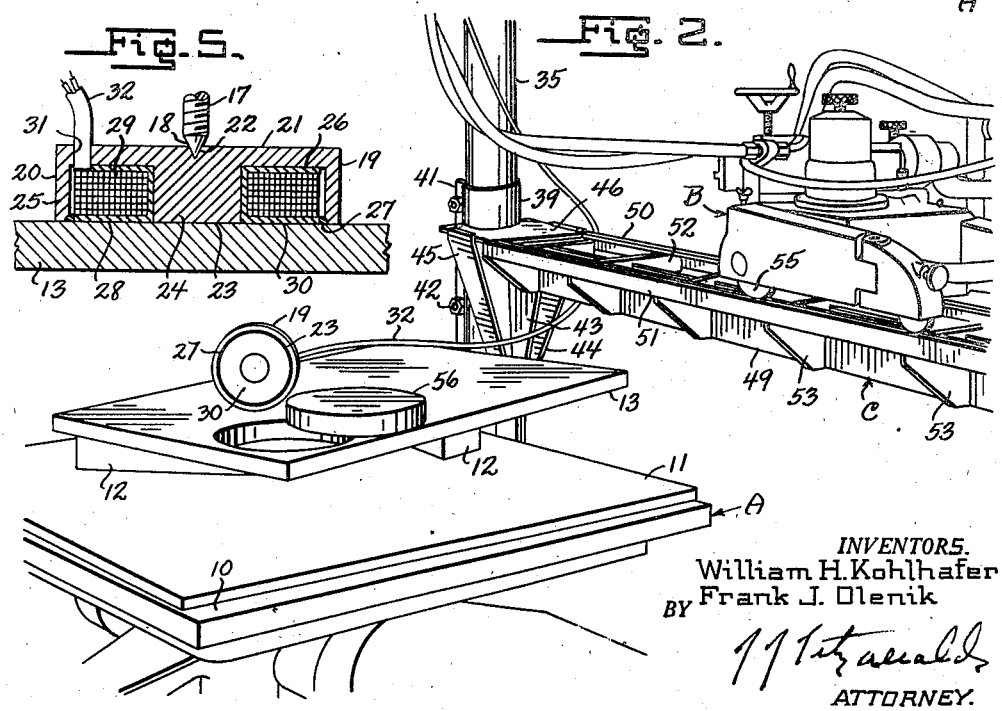
INVENTORS.
William H. Kohlhafer
Frank J. Olenik
BY
ATTORNEY.

Patented Nov. 21, 1944

2,363,007

UNITED STATES PATENT OFFICE 2,363,007

EQUIPMENT FOR CUTTING CIRCLES IN METAL SHEETS OR PLATES

William H. Kohlhafer, Cabin John, Md., and Frank J. Olenik, Alexandria, Va.

Application October 19, 1943, Serial No. 506,806

3 Claims. (Cl. 266—23)

(Granted under the act of March 3, 1883, as amended April 30, 1928; 370 O. G. 757)

The invention relates to improvements in metal cutters and more specifically to improved equipment for cutting circular shapes and openings in metallic sheets and plates.

When a wheeled-carriage type of cutting machine, such as shown and described in United States Patent No. 1,811,835 granted to Anderson, is used for cutting circles in sheets or plates, the surface of the work is utilized to support the wheeled carriage for movement in an annular path either inwardly or outwardly of the circle, to be cut. If the carriage is supported for movement in an annular path inwardly of the circle, the minimum radius of the circle is limited by the width of the carriage. Therefore the cutting of small circles has been done by arranging the carriage for movement in an annular path extra-circumferentially of the circle. This calls for the allowance of an annular marginal area around the circle to be cut, merely to provide the necessary support for the carriage. The cutting of small circles from the centers of large plates is objectionable because of the waste of valuable material.

The primary object of the present invention is to provide improved means for supporting the torch carriage so that circles of any size may be cut without excessive loss of material.

Another object of the invention is to provide, in conjunction with a work supporting table, means for supporting a wheeled-carriage type of cutting machine for universal movement in a plane parallel to the turntable.

A further object is the provision of supporting means of the character described whereby the carriage may be readily swung to an out-of-the-way position so as to not restrict the use of the turntable.

A still further object is to provide an electromagnetic radius-rod-centering device permitting the cutting of circles in sheets or plates without requiring centering indentations.

Other objects and advantages of the invention will become apparent during the course of the following detailed description, taken in connection with the accompanying drawing, forming a part of this specification, and in which drawing, Figure 1 is a fragmentary perspective view of the circle cutting equipment during use.

Figure 2 is a fragmentary perspective view of the circle cutting equipment with the torch carriage swung away from the work-supporting turntable.

Figure 3 is a central vertical longitudinal sectional detail view of a sleeve-like bearing preferably forming a part of the torch carriage support.

Figure 4 is a vertical transverse sectional view of the carriage support, taken on the line 4—4 of Figure 3.

Figure 5 is a central vertical sectional view of the electromagnetic radius-rod-centering device preferably forming a part of the equipment.

In the drawing, which for the purpose of illustration shows only a preferred embodiment of the invention, and wherein similar reference characters denote corresponding parts throughout the several views, the letter A generally designates a work supporting turntable; B, the wheeled torch carriage; and C, means for supporting the carriage B for universal movement in a plane over the turntable A.

While any suitable turntable A may be employed, we prefer to use a "welding manipulator" turntable because it is usually available in metal-working shops; is motor driven; and has a fine variable speed control. On the top face 10 of the turntable may be mounted an asbestos mat 11 carrying spacer blocks 12 for supporting the work sheet or plate 13 for rotation in a horizontal plane.

Preferably but not necessarily, the torch carriage B is of the type shown and described in the previously mentioned Anderson Patent No. 1,811,835. The carriage B includes a vertically and transversely adjustable arm 14 holding a cutting torch 15, and a laterally adjustable radius rod 16 having a vertically adjustable leg 17 terminating in a center point 18. In order to secure the radius rod 16 for swinging movement relative to a desired center point on the metal sheet or plate 13, without having to provide a centering indentation in the work, we use an electromagnetic centering device 19. This device comprises a short cylindrical body 20 formed of magnetic material such as soft iron, and provided in its upper face 21 with a cone-shaped indentation 22 for receiving the pointed end 18 of the radius rod leg 17. The lower end 23 of the cylindrical body 20 includes an axial boss 24, and an annular concentric flange 25 encircling an annular groove 26. Fitted in the groove 26 and secured as by soldering 27 is a sheet brass spool 28 carrying magnet windings 29. The exposed end face 30 of the spool is substantially flush with the lower end of the body. Extending through an opening 31 communicating with the groove 26 is a conductor cable 32 for connecting the windings 29 to a suitable source of electric current (not shown).

Referring now to the carriage supporting means C, there is provided, adjacent the turntable A, a stationary vertical standard 35, formed of any suitable material such as steel pipe. This standard 35 may be affixed to the floor or to the base of the turntable. Releasably secured to the standard 35, as by a set screw 36, is a vertically adjustable collar 37 carrying a thrust bearing 38 and a rotatable sleeve 39. This sleeve 39 partially encircles the standard 35 but is interrupted along one side between spaced flanges 40, 41 which are adjustably connected together as by bolts 42. This arrangement permits the sleeve to be fitted sufficiently close to the standard to prevent objectionable play while allowing the sleeve to turn without binding.

Fixed to the sleeve 39 opposite its interrupted side is a welded bracket assembly comprising a central vertical plate 43, opposite side plates 44, 45 which extend upwardly and outwardly from the lower end portion of the central plate 43, and a horizontal plate 46 bridging the central and side plates 43—45 at their upper ends. Secured to the bracket assembly, as by welding, is an elongate trackway 47 provided at its free end with an upstanding stop plate 48. This trackway includes a central longitudinal plate member 49, and opposite track members 50, 51 of inverted L shape in cross-section. These track members 50, 51 are secured in spaced parallel relation, as by transverse angle beams 52 and they are also rigidly connected to the central member 49, as by plates 53. The upper surfaces of the track members 50, 51 may be provided with longitudinal rectilinear grooves 54 for receiving the flanged wheels 55 of the torch carriage B. In the operation of the circle cutter, the sheet or plate 13 to be cut is laid anywhere on the turntable A, and the electromagnetic centering device 19 is attached to the desired portion of the work. It is not necessary to locate either the work or the centering device in alignment with the axis of rotation of the turntable. The cutting torch 15 and radius rod leg 17 are of course vertically adjusted for proper positioning relative to the upper face of the work, and transversely of the carriage B to fix the radius as desired. Upon rotation of the turntable, any motion of the center of the circle to be cut will be transmitted through the radius rod 16 to the carriage B, causing the trackway to swing and the carriage to roll back and forth. Since the radius rod 16 maintains constant the radial distance of the torch 15 from the center of the circle, it is evident that a true and smooth circular shape 56 will be cut from the work sheet or plate.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

We claim:

1. In equipment for cutting circles in metallic sheets or plates, a turntable for supporting a sheet or plate for rotation in a given plane, an arm, means supporting the arm for swinging movement in a plane parallel to said given plane, a cutting torch, a carriage for the torch supported for reciprocatory movement along the arm, and a radius rod fixed relative to the carriage, said radius rod being provided with means for pivotal connection to the sheet or plate at any selected center point for maintaining the torch at a predetermined radial distance from said selected center point on the sheet or plate as the sheet or plate rotates with the turntable.

2. In equipment for cutting circles in metallic sheets or plates, a turntable for supporting a sheet or plate for rotation in a given horizontal plane, a vertical standard disposed adjacent the turntable, an arm mounted for swinging movement about said standard in a plane parallel to and above said plane, a cutting torch, a carriage for the torch supported for reciprocatory movement along the arm, and a radius rod fixed relative to the carriage, said radius rod being provided with means for pivotal connection to the sheet or plate at any selected center point for maintaining the torch at a predetermined radial distance from said selected center point on the sheet or plate as the sheet or plate rotates with the turntable.

3. In equipment of the character described, a turntable for supporting a sheet or plate for rotation in a given horizontal plane, a vertical standard disposed adjacent the turntable, an arm provided with a longitudinal track, means supporting the arm for swinging movement about said standard in a plane parallel to and above said given plane, a cutting torch, a wheeled carriage for the torch mounted for reciprocatory movement along the track, and a radius rod fixed relative to the carriage, said radius rod being provided with means for pivotal connection to the sheet or plate at any selected center point for maintaining the torch at a predetermined radial distance from said selected center point on the sheet or plate as the sheet or plate rotates with the turntable.

WILLIAM H. KOHLHAFER.
FRANK J. OLENIK.